United States Patent
Korjani

(10) Patent No.: US 10,706,856 B1
(45) Date of Patent: Jul. 7, 2020

(54) SPEAKER RECOGNITION USING DEEP LEARNING NEURAL NETWORK

(71) Applicant: Mohammad Mehdi Korjani, South Pasadena, CA (US)

(72) Inventor: Mohammad Mehdi Korjani, South Pasadena, CA (US)

(73) Assignee: OBEN, INC., Pasadena, CA (US)

( * ) Notice: Subject to any disclaimer, the term of this patent is extended or adjusted under 35 U.S.C. 154(b) by 0 days.

(21) Appl. No.: 15/702,649

(22) Filed: Sep. 12, 2017

Related U.S. Application Data

(60) Provisional application No. 62/393,597, filed on Sep. 12, 2016.

(51) Int. Cl.
| | |
|---|---|
| *G10L 17/18* | (2013.01) |
| *G10L 17/02* | (2013.01) |
| *G06N 3/08* | (2006.01) |
| *G10L 19/02* | (2013.01) |
| *G10L 25/30* | (2013.01) |
| *G10L 15/16* | (2006.01) |

(52) U.S. Cl.
CPC ............ *G10L 17/18* (2013.01); *G06N 3/084* (2013.01); *G10L 15/16* (2013.01); *G10L 17/02* (2013.01); *G10L 19/02* (2013.01); *G10L 25/30* (2013.01)

(58) Field of Classification Search
CPC ....................................................... G10L 17/18
USPC ........................................................ 704/232
See application file for complete search history.

(56) References Cited

U.S. PATENT DOCUMENTS

| | | | | |
|---|---|---|---|---|
| 6,092,039 A | * | 7/2000 | Zingher | G10L 19/00 704/203 |
| 8,965,770 B2 | * | 2/2015 | Petrushin | G10L 17/26 704/270 |
| 9,396,180 B1 | * | 7/2016 | Salvador | H04N 21/233 |
| 9,466,292 B1 | * | 10/2016 | Lei | G10L 15/16 |
| 10,115,393 B1 | * | 10/2018 | Kumar | G10L 15/07 |

* cited by examiner

*Primary Examiner* — Susan I McFadden
(74) *Attorney, Agent, or Firm* — Andrew S. Naglestad

(57) ABSTRACT

A speaker identification/verification system comprises at least one feature extractor for extracting a plurality of audio features from speaker voice data, a plurality of speaker-specific subsystems, and a decision module. Each of the speaker-specific subsystem comprises: a neural network configured to generate an estimate of the plurality of extracted audio features based on the plurality of extracted audio features, and an error module. Each of the plurality of neural networks is associated with one of a plurality of speakers, and the one speaker associated with each of the plurality of neural networks is different for all neural networks. The error module is configured to estimate an error based on the plurality of extracted audio features and the estimate of the plurality of extracted audio features generated by the associated neural network. The neural networks are speaker-specific auto-encoders trained for one user and therefore calibrated on that particular user's speech. As a result, that speaker-specific neural network is highly tuned for the particular user and out of tune for all other users. Thus, the error associated with the speaker-specific neural network is relatively small and useful for purposes of identification or verification.

14 Claims, 6 Drawing Sheets

US 10,706,856 B1

SPEAKER RECOGNITION USING DEEP LEARNING NEURAL NETWORK

CROSS-REFERENCE TO RELATED APPLICATION(S)

This application claims the benefit of U.S. Provisional Patent Application Ser. No. 62/393,597 filed Sep. 12, 2016, titled "Speaker Recognition Using Deep Learning Neural Network," which is hereby incorporated by reference herein for all purposes.

TECHNICAL FIELD

The invention generally relates to a system for identifying or verifying a user based on their speech. In particular, the invention relates to a system and method for identifying or verifying multiple speakers using multiple auto-encoders trained to encode voice data of one of those speakers.

BACKGROUND

Speaker recognition consists of two major tasks: speaker identification and speaker verification. Speaker identification and verification have gained significant interest in speech technology and continue to grow. In speaker identification, the goal is to find the closest speaker in a data set to the unknown speaker. In speaker verification, an unknown speaker asserts an identity, and the task is to verify if this assertion is true whether the unknown speaker is in the data. This essentially comes down to comparing two speech data and deciding if they are spoken by the same speaker.

Recently, considerable progress has been made on speaker recognition using deep learning systems. In most of these systems, speaker recognition is performed by constructing a single neural network encoding data from multiple speakers. Output of the neural network is either the probability of correct authentication or direct classification of a specific user. The accuracy of the system depends of the size of the training data set of a specific user and how many users are in the data set (more data improve the performance of the system). These systems, however, are very large and must be trained on all speaker data and therefore re-trained when adding a new speaker. As a result, these prior art systems are relatively slow and difficult to update with new speakers. There is therefore a need for a new system that can be trained, implemented, and altered very quickly and easily.

SUMMARY

Instead of using a network for all users, the preferred embodiment features a user-specific network for each user and encodes the voice of the user in that specific network. There is one network for every user. That is, the system comprises a user-specific neural network for each user and that network is calibrated on that particular user's speech. As a result, that user-specific neural network is highly tuned for the particular user and out of tune for all other users. Thus, the error of using the user-specific neural network by the particular person is much smaller compared to other users.

The invention in the preferred embodiment features a speaker identification system comprising: at least one microphone for generating voice data from at least one speaker, at least one feature extractor for extracting a plurality of audio features from the voice data, a plurality of speaker-specific subsystems, and a decision module. Each of the speaker-specific subsystems comprises: a neural network configured to generate an estimate of the plurality of extracted audio features based on the plurality of extracted audio features, and an error module. Each of the plurality of neural networks is associated with one of a plurality of speakers, and the one speaker associated with each of the plurality of neural networks is different. The error module is configured to estimate an error between the plurality of extracted audio features and the estimate of the plurality of extracted audio features generated by the associated neural network. The decision module is configured to: compare the estimated error from each of the plurality of error modules, determine which of the plurality of neural networks generated the lowest estimated error, and output an identity of the one speaker associated with the one of the plurality of neural networks that generated the lowest estimated error.

In the preferred embodiment, the audio features are Mel-frequency cepstral coefficients (MFCC), linear prediction coefficients (LPC), line spectral frequencies (LSF), or short term Fourier Transform (STFT) features. The plurality of neural networks typically comprise auto-encoders, where each auto-encoder comprises encoder layers, decoder layers, and hidden layers. Each of the plurality of auto-encoders encodes training data from the one speaker associated with the auto-encoder.

BRIEF DESCRIPTION OF TIE DRAWINGS

The present invention is illustrated by way of example and not limitation in the figures of the accompanying drawings, and in which.

DETAILED DESCRIPTION OF THE PREFERRED EMBODIMENTS

Figure 1:
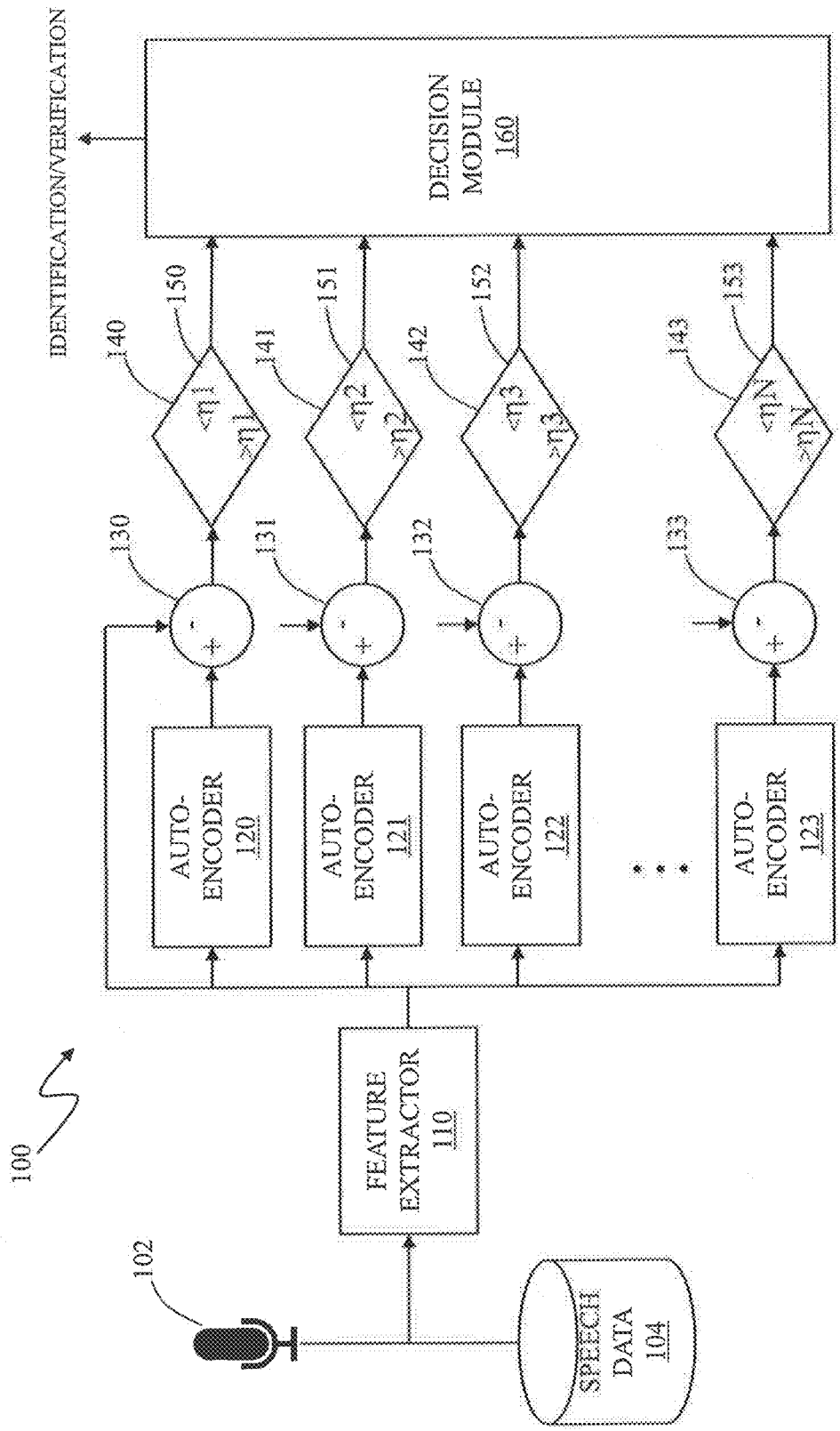
FIG. 1 is a system for determining the identity of a speaker or verifying the identity of a speaker using voice data, in accordance with an embodiment of the present invention.

Illustrated in FIG. 1 is a system for determining the identity of a speaker or verifying the identity of a speaker using voice data. The system, namely the speaker identification and verification (SIV) system 100, in the preferred embodiment includes a feature extraction module 110, a plurality of auto-encoders 120-123, a plurality of error modules 130-133, a plurality of threshold testers 140-143, and a decision module 160.

The feature extractor 110 is configured to receive live voice data from a microphone or pre-recorded voice data from a database 104 and then extract audio features that characterize the voice. In the preferred embodiment, the feature extractor extracts Mel-frequency cepstral coefficients (MFCC) from the voice data. In other embodiments, other features including linear prediction coefficients (LPC), line spectral frequencies (LSF), and short term Fourier Transform (STFT) features may also be used instead of MFCC coefficients. The audio features are extracted from each of a plurality of frames or segments of speech for the person to be identified or verified from among a plurality of speakers. The extracted features are provided as input to each of the plurality of auto-encoders. Each auto-encoder0-123 has been trained to encode the speech of one of the plurality of speakers that SIV system 100 is trained to verify or identify.

In the preferred embodiment, each of the plurality of auto-encoder 120-123 is associated with one of a plurality of individuals to be identified or verified by the SIV system. Each auto-encoder is preferably configured (a) to receive the MFCC features from the feature extractor 110, and (b) to convert or otherwise map input audio features of an individual's voice to a substantially identical set of audio features for the same individual with minimal error. Each auto-encoder is preferably a neural network or deep neural network trained on the voice data of a single individual. When the input audio features are derived from the same person for which the auto-encoder was trained, the output audio features are reproduced with a relatively small error. However, when the input audio features are derived from a different person than the one on which the auto-encoder was trained, the output audio features are reproduced with a relatively large error.

The magnitude of the error for each of the plurality of auto-encoders is measured by one of the plurality error modules 130-133 based on the input audio features from the feature extractor 11 and the output audio features from one of the auto-encoders. Each of the error measurements is then transmitted to one of a plurality of threshold testers 140-143 which determine whether or not the error is below a predetermined threshold for that particular user. When the error measurement is below the associated threshold, the speaker corresponding to the speech data is likely to correspond to the speaker on which the particular auto-encoder was trained. If below the associated threshold, the error measurement is transmitted to the decision module 160. In the preferred embodiment, the error threshold is unique to each user and calculated in the manner described below.

The decision module is configured to determine which of the auto encoders 120-123 corresponds to the lowest error measurement and identify or verify the speaker based on that determination. In this manner, the decision module 160 can effectively identify or verify the identity of a speaker based on error estimates from the plurality of auto-encoders.

Since the auto-encoders for a plurality of speakers are operated in parallel, the processing is performed in parallel and the identification procedure extremely fast. In addition, when a new speaker is added to the SIV system 100, only a new auto-encoder need be added for the speaker while the pre-existing networks remain unchanged.

Figure 2:
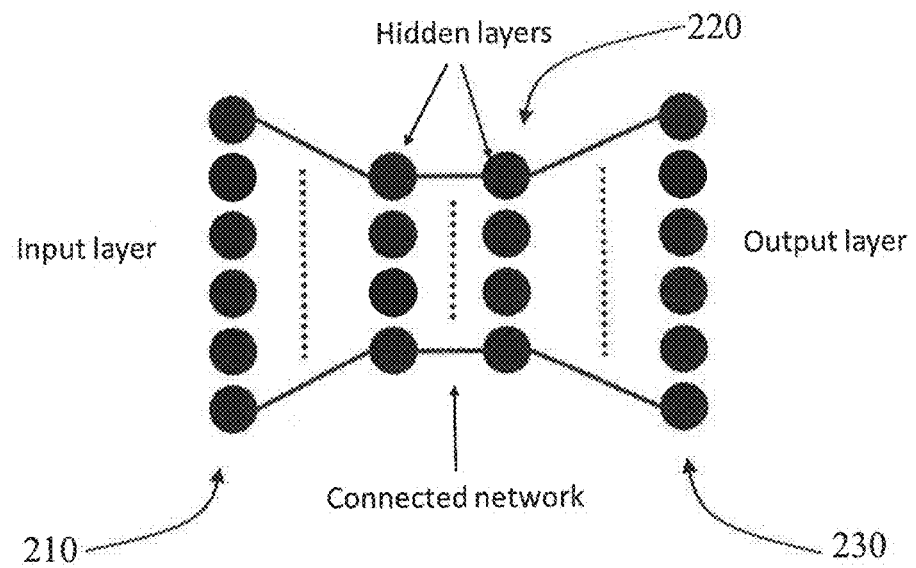
FIG. 2 is an exemplary auto-encoder, in accordance with an embodiment of the present invention.

Illustrated in FIG. 2 is an exemplary auto-encoder. The auto-encoder is one of a number of deep neural networks configured to learn and approximate a function from large amounts of MFCC features or other voice data. Most of the learning tasks correspond to supervised learning which means that the approximation of a function is inferred from a given set of inputs and outputs. Unsupervised learning is a type of machine learning algorithm used to draw inferences from data sets consisting of input data without labeled responses (output data). In the preferred embodiment, the auto-encoder neural network employs an unsupervised learning algorithm that learns a representation, i.e., encoding, of a set of voice data features. The goal of encoding a user's voice into a neural network is to extract unique features of the speaker's voice, provide an optimal output only for that speaker only, and provide a sub-optimal output for any other speaker.

To train a neural network, training data including user speech is transformed from the time domain into the frequency domain. An auto-encoder network is then trained on the extracted features. The link weights between nodes of the neural network in FIG. 2 are then iteratively adjusted using a back propagation or similar algorithm until the features generated as output best match the features extracted from the training data. Using data of a specific user to train an auto-encoder provides a "personal network" which is calibrated only for the specific person whose voice was used for training.

In the preferred embodiment, an auto-encoder comprises encoder layers 210, decoder layers 230, and optional hidden layers 220 which collectively encode features from the voice data by learning an approximation to the identity function, i.e., a function that generates an output the same as the input. Encoder layers change dimensionality of the input variable revealing interesting structure hidden in the data. Mapping function, $f$, with weight parameters, W, and bias term, b, encode input variables, X, to Z where $Z=f(WX+b)$. Decoder layers reconstruct the input data from the encoded data, Z, where $Y=f'(W'Z+b')$. The auto-encoder preferably minimizes the reconstruction error which means $e=\|Y-X\|$. By placing constraints on the network like nonlinear mapping function, adding hidden layers, adding sparsity, and/or limiting the number of hidden units, different hidden structure about the data—e.g. correlations—can be discovered and encoded in the neural network to optimize the network for the particular speaker. The number of neurons and hidden layers vary depending on the complexity of the problem.

Figure 3:
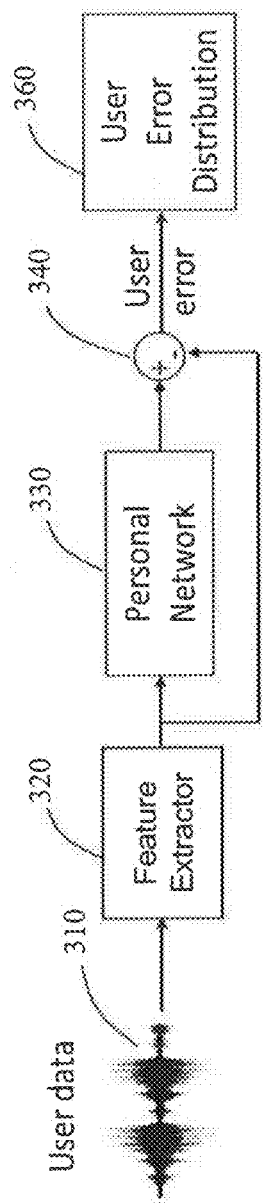
FIG. 3 is a first training system for training a single auto-encoder associated with an individual person and generating the associated error distribution, in accordance with an embodiment of the present invention.

Illustrated in FIG. 3 is a first training system for training a single auto-encoder associated with an individual person and generating the associated error distribution. The auto-encoder 330 may be trained on "user data" 310 comprising N different sentences (n=1, . . . , N) from a single speaker, each sentence having a length $T_n$ second ($t(n)=1, \ldots, T_n$). Each sentence is divided into frames, $F_n$, e.g., 1 frame is 25 milliseconds ($f(n)=1, \ldots, F_n$). The MFCC features, $\omega_i$, i=1, . . . , k, of each frame is extracted from each frame, e.g. 50 MFCC features, k=50.

Figure 4:
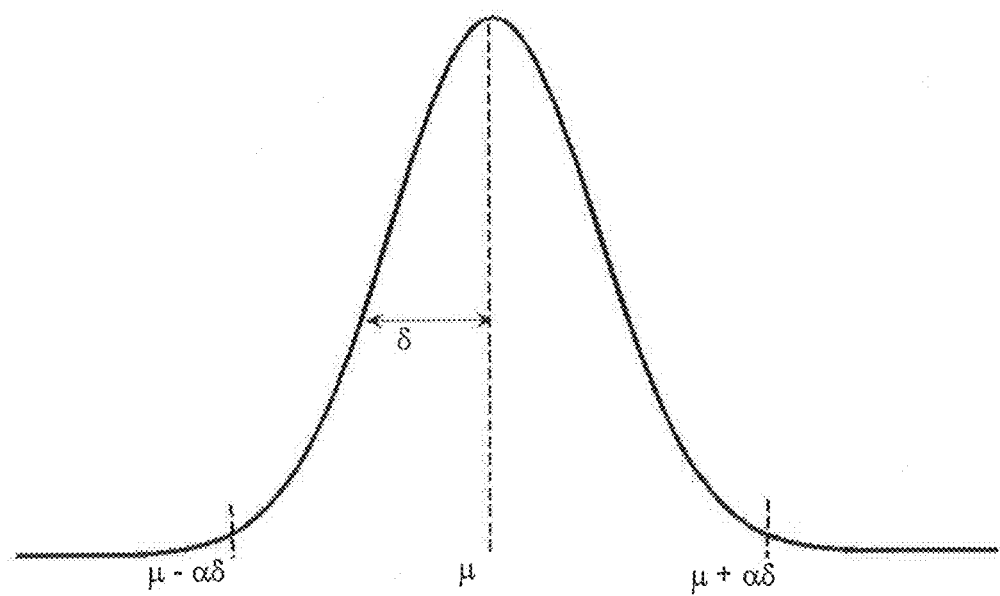
FIG. 4 is a distribution of errors between the input and output of an auto-encoder, in accordance with an embodiment of the present invention.

After training, statistical measures of errors are computed from the auto-encoder 330 for the individual person. The error is calculated on each MFCC feature:

$$e_i^{f(n)} = \omega_i^{f(n)} - \tilde{\omega}_i^{f(n)}, i=1, \ldots, k, f(n)=1, \ldots F_n, \text{ and}$$

n=1, . . . N where $\tilde{\omega}_i^{f(n)}$ (output of personal network) is an estimation of $\omega_i^{f(n)}$ which is the input of a "personal network", i.e., an auto-encoder encoding that user. For example, if we assume the distribution of errors 360 between the input and output of the auto-encoder has a normal distribution as shown in FIG. 4, the mean can be computed for the auto-encoder for each person as follows:

$$(\mu_i = \text{mean}(e_i^{f(n)}), f(n)=1, \ldots F_n, n=1, \ldots N),$$

and the standard deviation is given by:

$$(\delta_i = \text{STD}(e_i^{f(n)}), f(n)=1, \ldots F_n, n=1, \ldots N).$$

During implementation of the SIV system 100, the personal model (PM) verifies the user if the error rate of an unknown speaker is in the range $[\mu_i - \alpha_i \delta_i, \mu_i + \alpha_i \delta_i]$ where $\alpha_i$ is a scaling factor.

Figure 5:
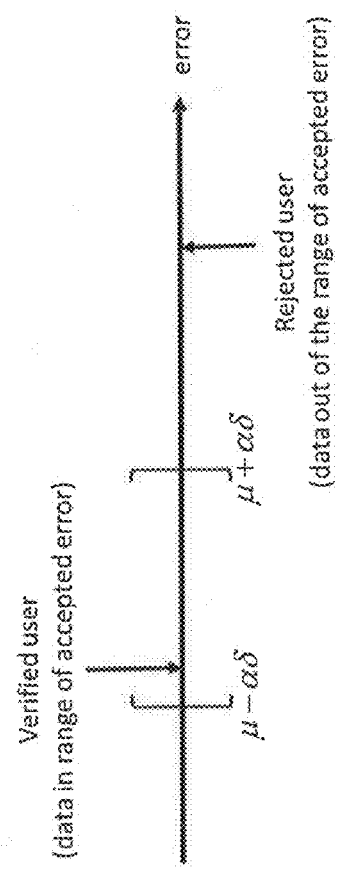
FIG. 5 is a diagrammatic illustration showing the tradeoff between True Acceptance Rate (TAR) and True Rejection Rate (TRR) for an error threshold, in accordance with an embodiment of the present invention.

A system threshold, $\eta_i$, can be defined by $\eta_i = \alpha_i \delta_i$. Increasing $\alpha_i$ causes the range of verification to become wider; hence increasing the False Acceptance Rate (FAR). Also, decreasing $\alpha_i$ causes the range of verification to become narrower; hence increasing the False Rejection Rate (FRR) increases. The purpose is therefore to optimize the tradeoff between True Acceptance Rate (TAR) and True Rejection Rate (TRR). By choosing $\eta_i$ in the range of $[0.5\delta_i, 1\delta_i]$ as shown in FIG. 5, the personal network can achieve more than 90% accuracy.

Figure 6:
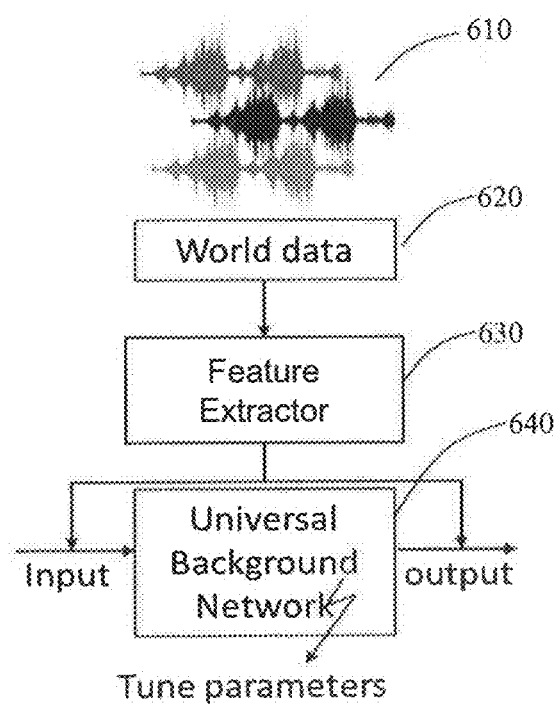
FIG. 6 is a second training system for training an auto-encoder associated with a universal background network, in accordance with an embodiment of the present invention.

Optimization of the range to maximize both TAR and TRR depends on each speaker's voice data. Instead of assigning the same threshold to all possible speakers, which would reduce the overall performance of the system 100, a personalized range is determined for each speaker. In order to automatically find a personal range $\eta_i$ we construct a universal background model (UBM) to decide the acceptance range of the user error. A universal background network represents all speakers rather than any individual speaker alone. Similar to "personal network" we construct a "universal background network" using many voice data 610 from a plurality of speakers which is represented collectively by "world data" 620, a feature extractor 630, and an auto-encoder 640, as illustrated in the system in FIG. 6. After training the UBM, namely the auto-encoder trained on world data, the error distribution of user data using the UBM network is determined.

Figure 7:
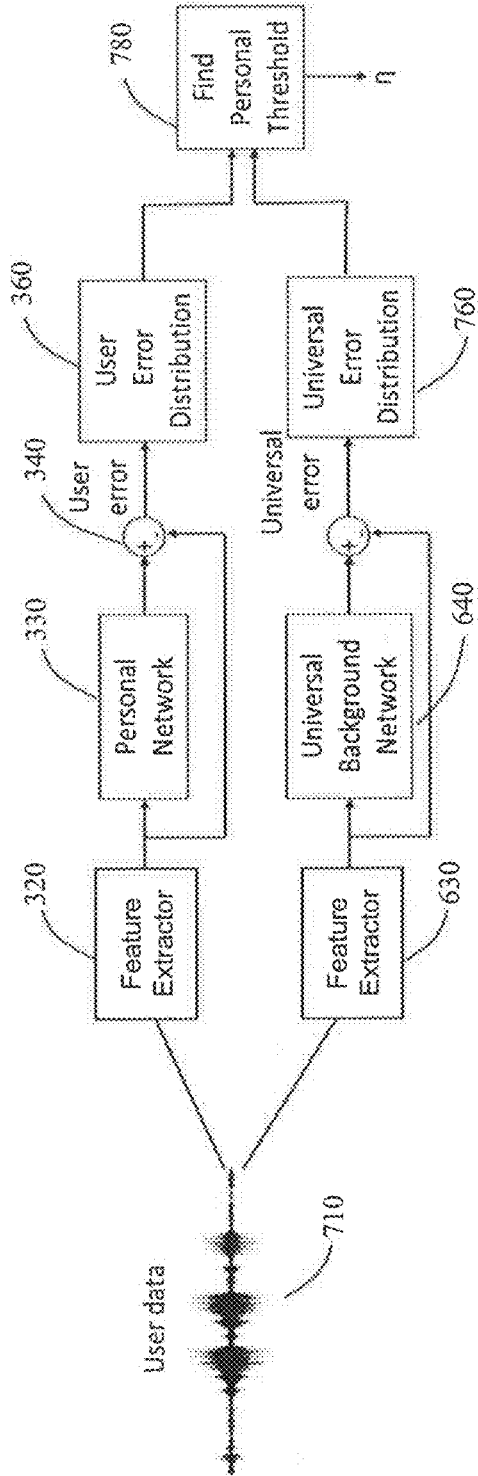
FIG. 7 is a system for generating a personal threshold used in a threshold tester in FIG. 1, in accordance with an embodiment of the present invention.

Illustrated in FIG. 7 is a second training system for generating a personal threshold used in a threshold tester 140-143 in FIG. 1. The personal distribution 360 and universal error distribution 760 are used to generate a personal threshold, $\eta$, for the particular speaker associated with the user data 710 and personal network 330. The intersection between distributions, $\eta$, provides an acceptance error range for the user which is given by:

$$[\mu_{PM} - \eta, \mu_{PM} + \eta].$$

Figure 8:
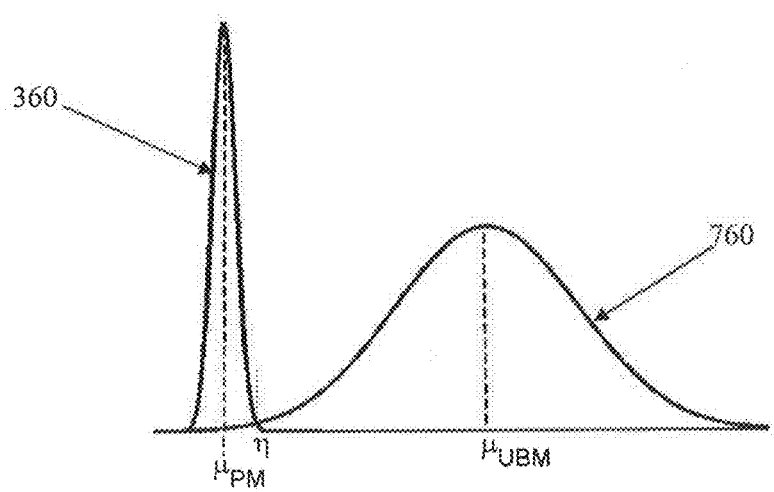
FIG. 8 illustrates errors in the form of a personal distribution and universal error distribution, in accordance with an embodiment of the present invention.

The personal distribution 360 and universal error distribution 760 are illustrated graphically in FIG. 8. As shown, the intersection between distributions yields the personal threshold, $\eta$.

Figure 9:
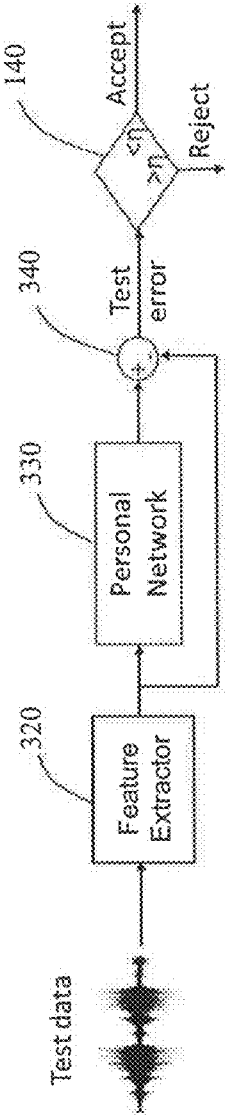
FIG. 9 is a system for verifying a speaker, in accordance with an embodiment of the present invention.

After training the personal network and finding the personal threshold, the network illustrated in FIG. 9 may be used to verify whether input speech was spoken by the same speaker associated with the personal network. If the speech was spoken by the same person, the error measurement is generally less than the personal threshold, $\eta$, associated with that speaker and the "accept" signal generated by the threshold tester 140.

Figure 10:
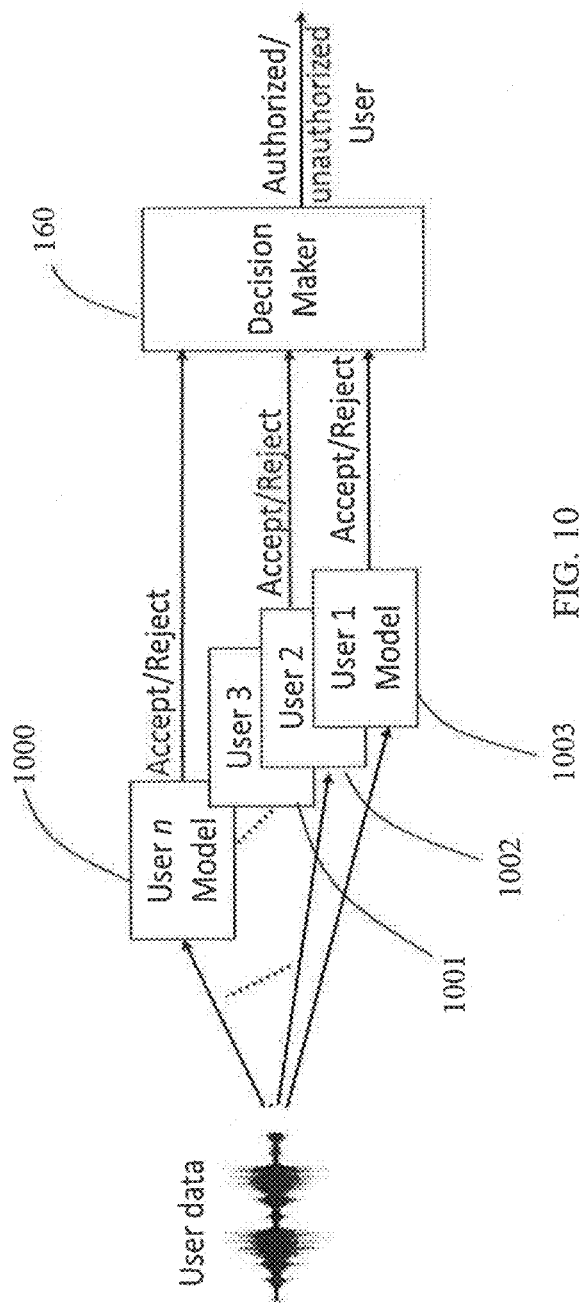
FIG. 10 is a system for identification of multiple speakers, in accordance with an embodiment of the present invention.

An exemplary system for identification of multiple speakers is shown in FIG. 10. Since the system in FIG. 10 is constructed from many speaker-specific subsystems 1000-1003 including neural networks associated with different individual speakers, the neural networks may be operated in parallel in order to speed up the identification procedure. After processing the error estimates for the user models, a decision module 160 is used to determine the identity of the speaker based on error measurements from the plurality of personal models 1000-1003. In general, the speaker associated with the user model producing the lowest error is identified.

One skilled in the art will recognize that the performance of the personal model with a fixed neural network structure increases when the network is trained on more data. This is an iterative process which means that the personal network is trained on the new data without rebuilding the network again. However, the personal model should rebuild again after changing the structure of the network which happens if the number of neurons is too small for a particular amount of data and the network over-fits.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A speaker identification system comprising:
   at least one microphone for generating voice data from at least one speaker;
   at least one feature extractor for extracting a plurality of audio features from said voice data;
   a plurality of speaker-specific subsystems, each speaker-specific subsystem comprising:
   a) a neural network configured to generate an estimate of the plurality of extracted audio features based on the plurality of extracted audio features; wherein each of the plurality of neural networks is associated with one speaker of a plurality of speakers, and the one speaker associated with each of the plurality of neural networks is different; and b) an error module configured to estimate an error between the plurality of extracted audio features and the estimate of the plurality of extracted audio features generated by the associated neural network; and a decision module configured to:
a) compare the estimated error from each of the plurality of error modules; and
b) determine which of the plurality of neural networks generated the lowest estimated error; and
c) output an identity of the one speaker associated with the one of the plurality of neural networks that generated the lowest estimated error.

2. The speaker identification system of claim 1, wherein the audio features are Mel-frequency cepstral coefficients (MFCC), linear prediction coefficients (LPC), line spectral frequencies (LSF), or short term Fourier Transform (STFT) features.

3. The speaker identification system of claim 1, wherein each of the plurality of neural networks comprises an auto-encoder.

4. The speaker identification system of claim 3, wherein each of the plurality of auto-encoders comprises: at least one encoder layer, at least one decoder layer, and at least one hidden layer.

5. The speaker identification system of claim 4, wherein each of the plurality of auto-encoders encodes training data from the one speaker associated with the auto-encoder.

6. The speaker identification system of claim 5, wherein each of the plurality of auto-encoders encodes training data with backpropagation.

7. The speaker identification system of claim 1, further comprising a:
a universal background neural network configured to receive the plurality of extracted audio features and generate an estimate of the plurality of extracted audio features; wherein the universal background neural network encodes training data from each of the plurality of speakers;
a universal background error module configured to estimate an error between the plurality of extracted audio features and the estimate of the plurality of extracted audio features generated by the universal background neural network.

8. The speaker identification system of claim 7, wherein the decision module is further configured to:
a) compare the estimated error from each of the plurality of error modules to one of a plurality of speaker-specific thresholds, wherein each speaker-specific threshold is associated with one of the plurality of speakers.

9. The speaker identification system of claim 8, wherein each of the plurality of speaker-specific thresholds is based on:

the plurality of extracted audio features;
the estimate of the plurality of extracted audio features generated by one of the plurality of neural networks; and
the estimate of the plurality of extracted audio features generated by the universal background neural network.

10. The speaker identification system of claim 8, wherein each of the speaker-specific thresholds is based on:
a first error distribution, wherein the first error distribution is based on the estimate of the plurality of extracted audio features generated by one of the plurality of neural networks;
and second error distribution, wherein the second error distribution is based on the estimate of the plurality of extracted audio features generated by the universal background neural network.

11. The speaker identification system of claim 10, wherein the speaker-specific threshold is based on an intersection between first error distribution associated with the speaker and the second error distribution.

12. The speaker identification system of claim 11, wherein the first error distribution associated with the speaker and the second error distribution are Gaussian distributions.

13. A method of identifying a speaker, the method comprising:
receiving voice data for at least one speaker from at least one microphone;
extracting a plurality of audio features from said voice data;
a plurality of speaker-specific subsystems, each speaker-specific subsystem comprising:
generating an estimate of the plurality of extracted audio features based on the plurality of extracted audio features using a plurality of neural networks; wherein each of the plurality of neural networks is associated with one speaker of a plurality of speakers, and the one speaker associated with each of the plurality of neural networks is different;
estimating an error between the plurality of extracted audio features and the estimate of the plurality of extracted audio features generated by the associated neural network using a plurality of error modules, each error module operatively connected to one of the plurality of neural networks;
comparing the estimated error from each of the plurality of error modules;
determining which of the plurality of neural networks generated the lowest estimated error; and
outputting an identity of the one speaker associated with the one of the plurality of neural networks that generated the lowest estimated error.

14. The method of identifying a speaker of claim 13, wherein the plurality of neural networks comprise a plurality of auto-encoders.

* * * * *